Dec. 26, 1933.   G. A. CROWTHER   1,940,675
WHEEL MOUNTING
Filed March 3, 1932

INVENTOR
GEORGE A. CROWTHER
BY R C Hopgood
ATTORNEY

Patented Dec. 26, 1933

1,940,675

UNITED STATES PATENT OFFICE 1,940,675

WHEEL MOUNTING

George Alfred Crowther, Jackson Heights, N. Y., assignor to International Safety Lock Nut Corporation, New York, N. Y.

Application March 3, 1932. Serial No. 596,526

3 Claims. (Cl. 301—9)

This invention relates to an improved method of detachably mounting rotating wheels on a supporting central member such as a hub.

It has been proposed in the wheel art to mount wheels either singly or doubly on a central hub in such a manner that the load imposed on the wheel is borne by a convex portion of a threaded member such as a nut acting in conjunction with a concave portion of the wheel. This proved to be disadvantageous due to the difficulty encountered in positively centering the concave portion of the wheel, with the registering convex portion of the nuts or other threaded members. This difficulty is due to the fact that the registering convex portion of the nut part, since it is integral with the nut, advances with the nut and necessarily at right angles to the axis of the nut. Hence, if there is any initial eccentricity of the axes of the convex and concave surfaces there will be a binding action on the screw threads which will prevent the surfaces from engaging throughout their entirety and hence contact will be established at only one point. As a result thereof the operator in installing the present type of wheel believes that, after tightening the nuts to the extent that he is able, the assembly is rigid. However, as soon as the assembly is subjected to a driving force it is apparent that the aforementioned eccentricity is relieved and play develops in what before had been a rigid connection. This play brings about wheel wobble and its accompanying wear on the assembled parts. It is apparent that this condition, while prevalent in single wheels, is greatly aggravated in the particular type of dual wheel construction illustrated in the appended drawing, since the possibility of eccentricity is greater and the imposed loads and vibration are more extreme.

This invention provides ways and means of overcoming this initial eccentricity of the engaging surfaces and likewise provides a means of establishing positive contact of the driving surfaces throughout their entirety.

Another object is to provide a positive lock between the constrained surfaces and the constraining surfaces in such a manner that the relationship between the surfaces will not be destroyed by shock or vibration but may be altered at will by the operator.

Further objects of the invention will be apparent from the detailed description to follow.

The invention is illustrated in the accompanying drawing, wherein.

In general, the invention consists of providing fastening devices for use in connection with wheel construction in which the wheel discs are provided with stud holes through which the studs mounted on the hub flange extend. It is proposed to provide for each of these studs one or more fastening devices of such a character that between said stud and wheel body is interposed a resilient member having an inherent locking quality. More specifically, each stud is provided with, in the case of a single wheel body, a nut carrying on its innermost extremity a resilient member of helicoidal shape adapted to co-operate with the concave portion of the stud hole in such a manner that, regardless of the eccentricity of the stud and the stud hole, the convex and concave surfaces will be in contact throughout their entire working surface. Consequently, when the connection is completely assembled, the rigid fixed relationship between the wheel body and the hub is maintained and provides a deterrent to the loosening of the assembled parts. In the case of the dual wheel construction, each stud is provided with an elongated threaded sleeve carrying on its innermost extremity a resilient member, co-acting with the inner wheel body in the manner just described in connection with the single wheel body. Each of these sleeves has a nut capable of being screwed on to the exterior thereof. Each nut has a resilient member on its innermost extremity, co-acting with the outer wheel body, in such a manner that the wheel body is obliged to assume a definite fixed relationship of concentricity with the inner wheel regardless of its initial eccentricity. Furthermore, said resilient body has an inherent quality of acting as a deterrent to loosening of the assembly independently of the inner wheel fastening.

Figure 1:
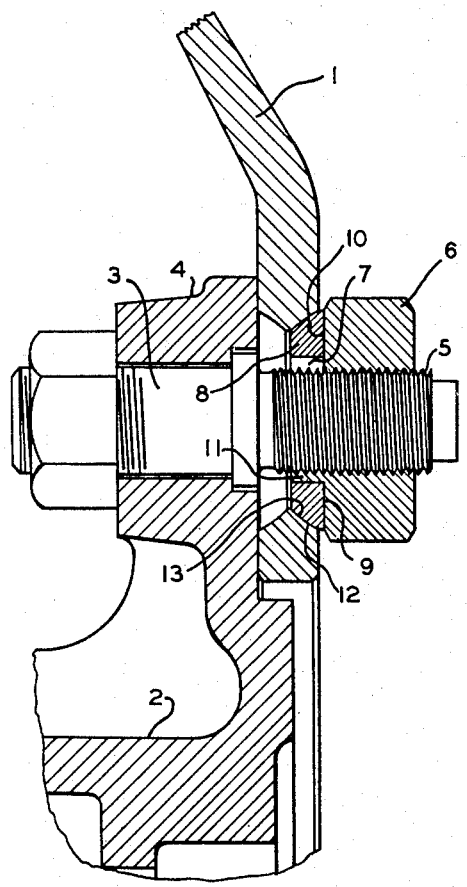
Fig. 1 is a section taken through a wheel disc and hub in a plane containing the axis of the wheel and hub, showing one of a plurality of the wheel mounting devices embodying a preferred form of the invention.

Referring now to Fig. 1 of the drawing, the single wheel mounting comprises a wheel body 1, mounted on a hub 2. The hub is of universal construction and carries a plurality of studs 3, extending parallel to the axis of the hub, and arranged in the customary manner around the flange 4. As illustrated there is a clearance between the central opening in the disc 1 and the hub body 2 as is the practice with this type of wheel construction. As is customary in this type of wheel there is a central radial portion of the wheel body in which are placed stud holes corresponding in position and number to the studs carried by the hub flange, so that when the disc is mounted on the hub the studs projects through these holes. In current practice these holes are provided from both sides of the wheel body with concave recesses, though according to the present invention any surface of revolution having the tangent at any point making an acute angle with the axis of revolution will suffice. The stud as customarily provided has a threaded portion 5 extending outwardly from the flange. It is noted in this connection that there is in the desired assembled position considerable clearance between the external diameter of the stud and the internal diameter of its registering hole. An internally threaded nut 6 is screwed onto the portion 5 of the stud. The nut 6 has an annular collar 11 on its innermost extremity, in which are transverse radial splits 7 whose depth axially corresponds to the depth of the collar. On the external surface of the collar is placed, prior to assembly, a split, helicoidal resilient washer 8 in such a manner that its radial face 9 is in contact with the flat radial face 10 of the nut body.

In connection with the prior assembly of the nut body and the resilient washer it is to be noted that the washer is of helicoidal shape and is in effect a helicoidal spring of one turn. Since the material of the washer is tempered steel there is in it a great deal of inherent resiliency. For convenience in handling, the internal diameter of the washer 8 as manufactured is slightly smaller than the external diameter of the collar 11. This necessitates springing of the washer or compensator a slight amount in a radial direction, when assembling on the nut 6. The resiliency of the washer then causes it to grip the collar 11 and thus permits the nut and washer to be handled as one piece for all practical purposes. This initial grip, however, has no harmful effect on the subsequent operation of the washer, as hereinafter described, since, under stress, the natural resiliency of the nut body compensates for this.

As the nut 6 is screwed onto portion 5 of the stud, the washer is brought into contact with the wheel body. To prevent binding and subsequent injury to the contacting bodies at assembly, the helix of the washer 8 is in a reverse direction to that of the screw thread, i. e., if the screw thread is of a right-hand helix, the washer is of a left-hand helix, and the angle with which the two surfaces approach each other is acute. As surface 12 of washer 8 engages surface 13 of the wheel body at its nearest point radially, and since there is initial friction between the washer and the nut body, the washer turns with the nut body initially locating itself in much the same manner as a screw thread and the eccentricity of the mating surfaces of revolution is to some extent removed. When the load developed in removing this eccentricity is great enough the washer moves relative to the nut and thus seats itself in the mating recess in the wheel body, irrespective of any remaining eccentricity. When this has been accomplished and the washer has assumed a flat form under load, a further application of torque to the nut causes the washer to move both axially, due to the axial advance of the nut, and radially, due to the constraining action of the mating surfaces of revolution. This co-action of nut, washer, and stud forces the wheel disc into intimate contact with the wheel hub and positively centers the stud in its respective registering hole in the wheel disc.

This radial constriction causes the washer to grip collar 11, the threaded segments of which grip the threads of the stud 5, and thus while centering the stud hole and the registering stud the resilient collar 11 imposes a frictional load on the threads of the nut and the stud which prevents any inadvertent loosening of the connection. It is to be noted that this load imposed on the threaded connection is at right angles to the axis of the member and hence is at right angles to any imposed vibratory forces. The locking power of the connection is therefore unaffected by the vibration. It is apparent then that, when the assembly is in the condition just described, any load imposed on the wheel is supported by the resilient member which has been forced to assume a certain fixed relationship to the assembly. It is apparent also that the resilient member being movable axially and radially so positions itself under constricting influences that it presents its greatest bearing area to each of the constraining surfaces, thus forming a rigid coincident connection between the wheel and its mounting stud. Furthermore, the mating surfaces of revolution are so shaped that the radial reaction on the washer increases at a greater rate than the axial reaction. This means that there is a point in the axial advance of the nut when the reacting radial load equals the applied torque, thus preventing further advance of the nut and its consequent stripping of threads or elongation of the bolt.

The mating surfaces of revolution 12 and 13 are shown in Fig. 1 as being spherical, but it will be apparent that they may take any other appropriate form; for example, they may be conical.

Figure 2:
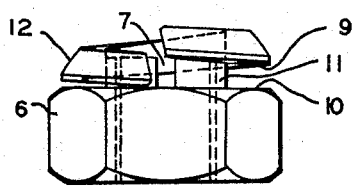
Fig. 2 is an elevation of the nut and washer, illustrated in Fig. 1, as it appears in its unassembled form.

In Fig. 2 the helical shape of the washer is clearly seen, and also the split in the washer 8 and the splits 7 in the nut collar 11. It is to be noted that the washer 8 is prevented by the collar 11 from damaging the threads on the stud 5 during its radial and axial movements. This is an improvement over prior tyes in which the bore of the washer gripped the threads.

Figure 3:
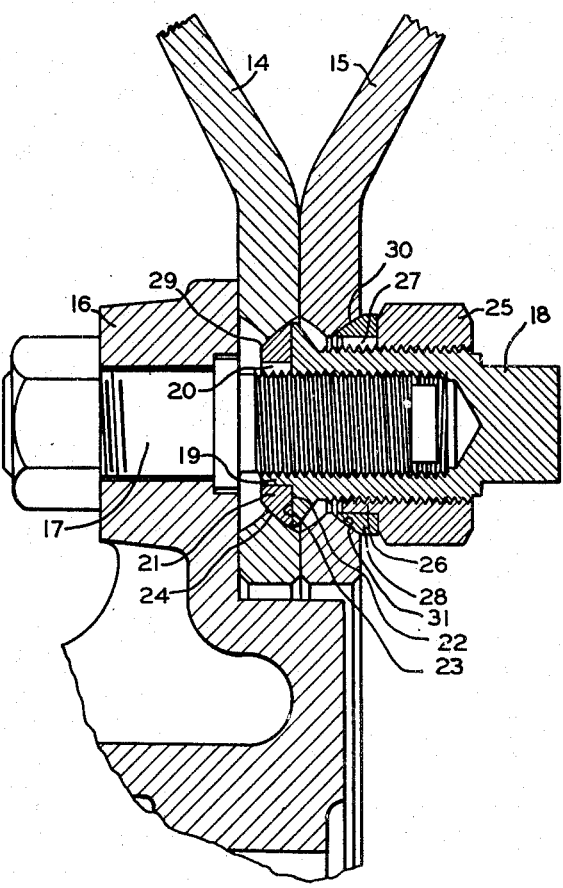
Fig. 3 is a section through a dual wheel mounting showing the two wheel discs, hub and one of a plurality of fastening devices in their assembled relationship.

Fig. 3 shows a dual wheel mounting having two wheel bodies or discs 14 and 15. The face of disc 14 is in contact with the hub flange 16 in the same manner as the single wheel disc 1 in Fig. 1. Similarly, inner face of disc 15 is in contact with the outer face of disc 14. Wheel body or disc 14 is to be definitely located or positioned with respect to hub flange 16 and its accompanying studs, of which 17 represents one of a plurality, by means of devices similar in action to the nut 6 and washer 8 of Fig. 1.

Threaded sleeve 18 which screws onto the stud 17 has at its innermost extremity an annular collar 19 in which are transverse radial splits 20 whose depth axially corresponds to the depth of the collar. The outermost extremity of the sleeve 18 is so shaped that a wrench may be applied to it to develop the necessary torque to complete the assembly. On the external surface of the collar 19 is placed, prior to assembly, a split helicoidal washer 21 in such a manner that its radial face 22 is in contact with the flat radial face 23 of the threaded sleeve. It should be noted that the threaded sleeve 18 performs the same service as the nut 6 in Fig. 1. The assembly is tightened in the same manner as that shown in Fig. 1 with the same results. In other words, the wheel body 14 is centered on its supporting studs 17 and the concave recess 24 is gripped by the washer 21 which also constrains the segmented collar 19 so as to force it to grip the threads and lock the sleeve 18 to the stud 17. The wheel body 14 is also held against the flange 16 and the load is supported by the resilient washer 21.

The threaded sleeve 18 is also externally threaded to accommodate a nut 25, which on its innermost extremity has an annular collar 26. The collar 26 has radial splits 27 whose axial depth is the depth of the collar. The external surface of the nut is of a polygonal nature so as to accommodate a wrench to develop the necessary torque. A resilient split helicoidal washer 28 similar to washer 21 is placed on the outer surface of the split annular collar 26. It is proposed that after the inner wheel body 14 has been mounted on the hub, in such a manner that it is rigidly and definitely held by the fastening device consisting of sleeve 18 and washer 21, the outer wheel body or disc 15 may be rigidly held in a definite relationship to the wheel body 14 and the hub. Assuming that the operations outlined in the preceding paragraph have been completed, the outer wheel body 15 is placed on the hub so that the stud holes register with corresponding studs upon which have been screwed the fastening sleeves 18. There is considerable clearance between the wheel body 15 and the sleeve 18 to prevent binding. The nut 25 is then screwed on the threaded sleeve 18 in such a manner that the split helical washer, which has previously been placed onto the collar 26 of the nut, is towards the wheel body. When the nut has been screwed home the action of the nut and washer is the same as heretofore explained, that is, the wheel has been aligned with the sleeve 18 and is in constrained relationship with the inner wheel 14, and the load is supported on the resilient washer 28 which grips the collar 26 and causes the nut 25 to be locked to the sleeve 18. Since the sleeve 18 has already been locked to the stud, the nut 25 is in effect locked to the stud and hence to the hub. Thus the two wheel parts are rigidly mounted independently of each other and irrespective of any eccentricity that may have been present.

Figure 4:
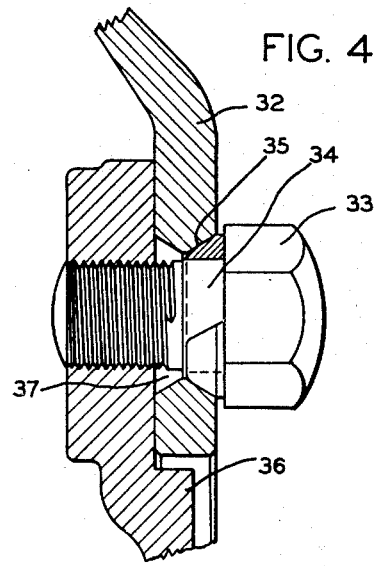
Fig. 4 is a section similar to Fig. 1 in which the mounting device is of a form commercially known as a cap screw used in connection with a special washer and embodying the invention.

In Fig. 4 there is shown a form of wheel mounting in which the wheel body 32 is similar in shape to those previously described herein. In this type, however, the wheel is held or mounted by the use of what may be termed cap screws. In the prior art these cap screws had shaped surfaces upon which the wheel was supported. This, however, leads to the same difficulties as the nut and stud type previously mentioned, namely, poor frictional contact between mating surfaces due to eccentricity of hole and screw body. This in turn brought about looseness in service and its consequences. To obviate this, each cap screw 33 is provided with a flange 34 of slightly larger diameter than the major diameter of the screw threads, and upon this collar is mounted a split helical spring washer whose exterior diameter is shaped to accommodate the recess 35 surrounding the mounting hole, and whose radial diameter is adapted to grip the collar 34. The wheel body is mounted on the hub 36, by inserting the cap screws 33 through their respective mounting holes 37 in the wheel body, and into their threaded registering holes in the hub 36. As the cap screw is tightened down the helical washer encounters the recess and due to its screwing action forces the wheel body to position itself relative to the screw. The washer grips the screw body initially with a slight amount of tension and when the load of the frictional contact with the mating surface on the wheel becomes great enough the washer moves relative to the screw. Further axial advance of the screw causes the washer to seat itself completely in the recess and eventually to grip the collar 34. There is a point in the assembly when the frictional loads become equal to the applied torque, hence, elongation of the screw or stripping of the threads is avoided. When under strain the elasticity of the spring washer acts as a deterrent to the loosening of the assembly and provides a resilient support for the wheel.

For some purposes it is permissible to employ a nut such as 6 of Figs. 1 and 2, and such as 18 and 25 of Fig. 3 with a continuous non-slotted collar 11, 24 or 26. While not as efficient as the nut with slotted collar, it is a distinct improvement over the prior art wheel mounting. The disadvantages of the prior art wheel mounting having been previously discussed, the application of this form of my invention will be disclosed and its action noted. The nut is screwed onto the stud with the washer towards the wheel body. As the leading edge of the washer comes into contact with the recessed groove in the stud hole the screwing action forces the hole to align with the stud until the friction of the washer on the mating surface overcomes the frictional grip of the washer on the collar of the nut. When such is the case the washer moves axially with axial advance of the nut, and since it is free of the nut, seats itself in the recessed groove. Further axial movement of the nut first flattens the washer and then coacting with the recess causes the washer to be constricted and to grip the nut collar body. It is self-evident that the washer is likewise in frictional contact with the groove in the wheel and with the flat radial surface of the nut body. This frictional contact is much greater than is possible with the prior art arrangements and hence presents greater anti-loosening power.

What is claimed is:

1. A wheel and hub assembly comprising a hub having a plurality of studs extending parallel to the axis thereof, a wheel body mounted thereon and having holes through which said studs extend, a plurality of internally threaded bodies screwed onto said studs and having split resilient internally threaded collars integral therewith, each collar having an outer wall concentric with the axis of the cooperating stud, split resilient washers each wedge shaped in cross section and having an inner wall substantially parallel to the outer wall of the respective collars to co-act with said registering stud holes to exert, when assembly is complete, a force in a radial direction on the collars of respective internally threaded bodies to lock said bodies to said studs, and to exert a force in an axial direction to clamp said wheel body to said hub, said axial and radial forces positioning said wheel body on said hub in a definite fixed concentric position.

2. In combination with a wheel and hub assembly comprising a hub having a plurality of externally threaded members protruding therefrom and a wheel body having a plurality of holes adapted to mate with said members and having annularly recessed extremities, means for clamping said wheel body to said hub comprising internally threaded members having split resilient collars integral therewith, each collar having an outer cylindrical wall concentric with the axis of the co-operating externally threaded member, split helicoidal resilient washers of wedge-shaped cross section fitted over said collars and having inner walls shaped like the outer walls of the collars so as to engage and constrict said collars when forced into said annular recesses by tightening of said internally threaded members on said externally threaded members, said constriction serving to clamp said internally threaded members to said externally threaded members by gripping the threads thereof.

3. In combination with a wheel and hub assembly comprising a hub having a plurality of externally threaded members protruding therefrom and a wheel body having a plurality of holes adapted to mate with said members and having annularly recessed extremities, means for clamping said wheel body to said hub comprising internally threaded members having split resilient collars integral therewith, each collar having an outer cylindrical wall concentric with the axis of the co-operating externally threaded member, and radially resilient washers of wedge shaped cross-section fitted over said collars, each washer having an inner wall shaped like the outer wall of its collar and an outer wall shaped to conform to the co-operating annular recess and a third wall of said washer and a co-operating wall of said internally threaded member being similarly shaped, whereby tightening of said internally threaded members on said externally threaded members causes said washers to engage said annular recesses and said collars thereby to constrict said collars so as to clamp said internally threaded members to said externally threaded members by gripping the threads thereof.

GEORGE ALFRED CROWTHER.